May 17, 1927.
E. B. MABEE
FILM DEVELOPING HOLDER
Filed April 7, 1925
1,629,285
2 Sheets-Sheet 1
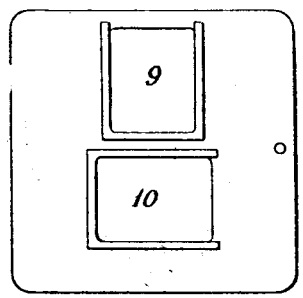
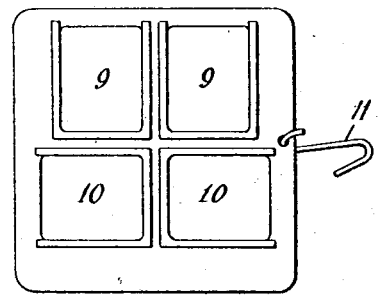
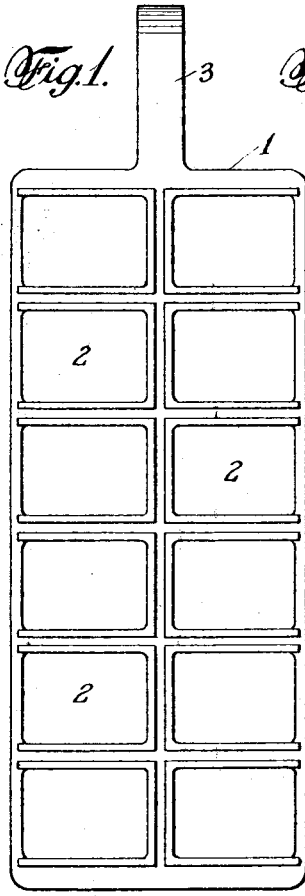
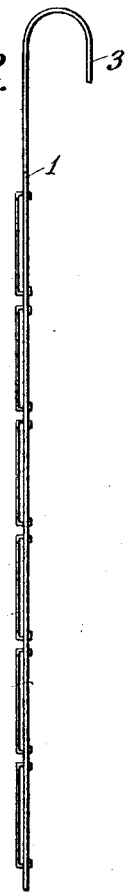
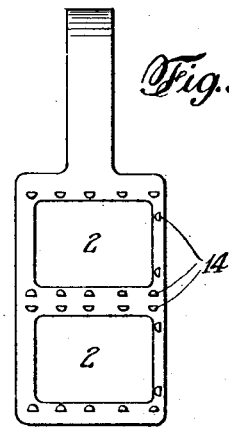
INVENTOR
Elliott B. Mabee
BY
Kenyon & Kenyon
ATTORNEYS May 17, 1927.
E. B. MABEE
1,629,285
FILM DEVELOPING HOLDER
Filed April 7, 1925     2 Sheets-Sheet 2
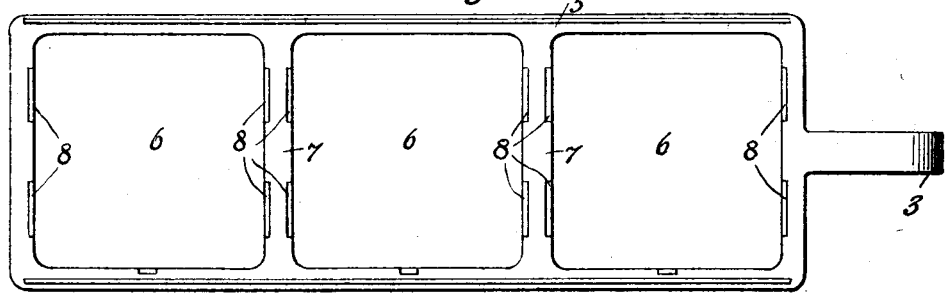
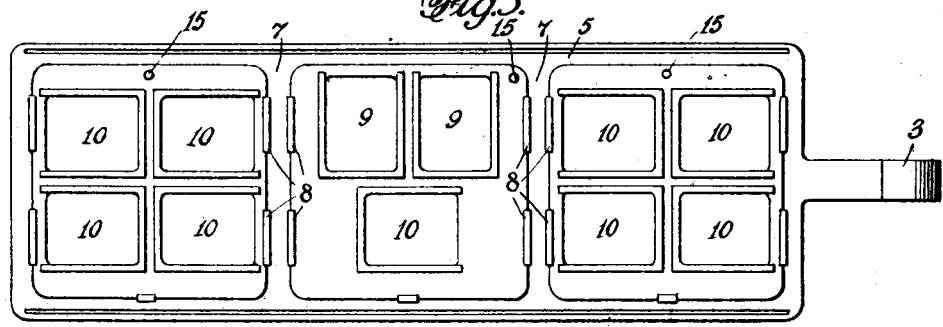
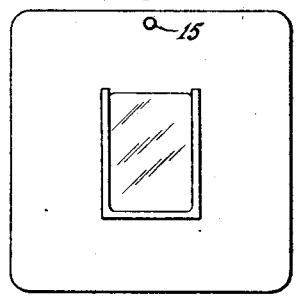 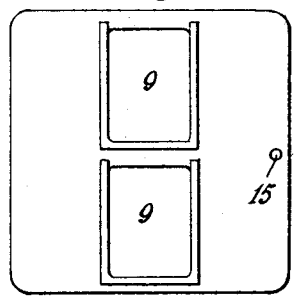 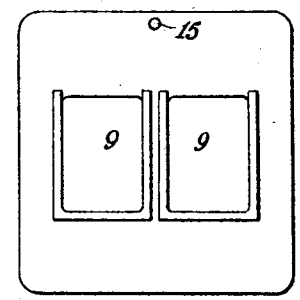
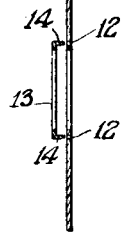 
INVENTOR
Elliott B. Mabee
BY
Kenyon & Kenyon
ATTORNEYS.

Patented May 17, 1927.

1,629,285

UNITED STATES PATENT OFFICE.

ELLIOTT B. MABEE, OF BROOKLYN, NEW YORK.

FILM-DEVELOPING HOLDER.

Application filed April 7, 1925. Serial No. 21,267.

My invention relates to improvements in means for holding films during the process of development, and is particularly adapted for use in connection with the development of X-ray films.

At present the only other device I know of for this purpose is a metal holder which comprises a bar of metal, with a curved projection to engage the side of the developing tank. Riveted and soldered to the bar is a series of spring clips. Each film to be developed is grasped near its edge by one of these clips. This device has many objectionable features. Among them is that the film is indented or perforated at its point of seizure, and, aside from the disadvantage of mutilating the film by puncturing it, there is danger of an operator engaging a part of the exposed section of the film with the clip. Furthermore, as the film is held only at one point, it immediately curls on immersion in the developing fluid, and, before it can be examined properly, must be dried and then straightened out by insertion in a mount of some kind. Another disadvantage of this holder is that the springs in time become weak, and it is very common to have films work loose and sink to the bottom of the tank, where they are located by sense of touch, and rescued with the very imminent attendant risk of the soft surface emulsion being scratched or injured beyond recognition. Again, the clips become loose not only from use, but also because the developing fluid gradually eats away the solder, for which it has an affinity, consequently weakening the rivets.

Among the objects of my invention is the provision of a holder in which no soldering or rivets are used, which will not affect or be affected by the developing liquid, which will hold the films during immersion firmly and without mutilating them, and in such a way that they can not curl.

Another object of the invention is a holder in which the films may be developed, fixed, washed and dried, in a flat position, and be examined at all times, even while in a wet condition; and one that can be used in connection with a tray as well as a tank.

Another object is a holder in which the films may be placed in the position and order in which they were taken, before being developed, so as to be ready for diagnosis as soon as the developing is completed.

Other objects and advantages will appear from the following description, taken in connection with the accompanying drawings forming part hereof, and in which similar numerals of reference refer to corresponding parts.

Figure 1 is a front elevation of one form of my holder, with receptacles for twelve films; Fig. 2 is a side view of the same; Fig. 3 is a rear view of a holder with receptacles for two films; Fig. 4 is a front view of another form of my holder; Fig. 5 is a similar view showing three separate film holders inserted in it; Figs. 6, 7, 8, 9 and 10 are individual film holders with variously arranged openings; Figs. 11, 12 and 13 are detail views.

Referring to the drawings, and particularly to Figs. 1, 2 and 3, 1 designates a form of my holder having twelve receptacles, 2, for the reception of films. One end of the holder is provided with a hook, 3, by which it is suspended from the edge of the developing tank. The open end of each one of the receptacles 2 has its corners upturned as shown clearly at 4 in the enlarged sectional view in Fig. 13, to facilitate the insertion of the film. Fig. 3 illustrates a rear view of a smaller holder of this kind, and shows the fastening means for attaching the parts of the holder together as explained below.

Referring to Figs. 4 to 10 inclusive, 5 indicates another form of my holder, with a hook, 3, similar to that shown in the first form described. This holder is provided with three compartments, 6, 6, 6, which are separated by cross-bars 7, and with depressed portions 8, the latter serving as guides and means for holding separate film holders in place. In Fig. 5 three separate film holders are shown mounted in the main holder.

In Figs. 5, to 10 inclusive, I have shown individual film holders with their openings arranged vertically and horizontally and in combination. The vertical openings are numbered 9 and the horizontal openings 10, for the reason explained hereinafter.

Each one of these openings is surrounded by a guideway on three of its sides, against which the film abuts when in position, as shown in Fig. 6, the upturned corners, 4, which are a feature of all the individual film holders as well as of the form shown in Figs. 1 to 3, facilitating the insertion of the film through the open end. Each of the individual holders is also provided with a hole by which, through the medium of the detachable hook 11, it may depend from the side of the developing tank or be placed in and removed from the developing tray.

The construction of my holder or hanger is of great importance as it is designed to avoid the use of solder or the need of riveting. It is constructed of metal, preferably of Monel or any other non-oxidizable metal. Its parts are stamped out in the usual way, and the individual holders are provided with small holes 12, and the part 13, forming the guideways surrounding three sides of the openings 9 and 10, furnished with projections or ears 14, Fig. 11. These ears are inserted through slots corresponding therewith and turned over, thus holding the two parts permanently together, as shown in Figs. 12, 13, 2 and 3.

In the use of the holder shown in Figs. 1 to 3 the films are simply inserted in place and the holder suspended in the developing tank by means of the hook 3, or laid flat in the developing tray with the emulsion side upward. The film receptacles are preferably numbered so that where several cases are being developed at the same time, which is usual, the films relating to particular persons may be identified by the numbers.

The three-compartment holder shown in Figs. 4 and 5 is designed to enable an operator to slide into it the individual holders shown in Figs. 6 to 10 inclusive, the latter containing films in the position and order in which they were taken, to develop the films, and examine them in that position and order without removing them from the holder, and in one position of the three-compartment holder, regardless of the number of films taken, and whether they are to be viewed vertically or horizontally. One such possible combination is shown in Fig. 5. To this end I have shown a series of individual holders with vertical and horizontal windows in various combinations, which are adapted to be mounted in the three-compartment holder, the individual holders chosen in particular cases being of course such as will permit the insertion of the vertical or horizontal negatives in their proper positions, and so allow of their subsequent examination or diagnosis in one position of the three-compartment holder. The method followed in the use of this holder is as follows. Assuming that the full mouth is to be radiographed, the light-proof packet containing the X-ray film is first marked with, say "U. L. M.", to identify the upper left molar, and after exposure the film is placed in an individual holder in the position, vertical or horizontal, in which it was taken. The same method is followed with the upper left cuspids and bicuspids, upper centrals, and so on. The individual holders are then placed in the main three-compartment holder in their proper position and sequence, as indicated by the markings on the light-proof packets, and developed, and when ready for diagnosis may be examined without taking them from the holder as they will be in their proper position, that is, the position and order in which they were taken.

Where a single X-ray only is taken, the holder shown in Fig. 6 will accommodate it whether it is taken in vertical or horizontal position, as the holder is square; and where more than one is taken, the position or positions in which they were taken will direct the use of the proper holder in order that, after they have been developed, they may all be examined at the same time in any one position of the holder. Where individual holders are used the detachable hook 11 is employed as explained above.

One of the great advantages of my invention is that the films are always maintained in a flat position, and are held firmly. I have found that the effect of the immersion is to seal the films to the sides of the receptacle, and that a slight effort is necessary to break this seal. It is impossible for them to curl or snap out of my holders, and it is not necessary to delay examination until they are dried and mounted as they may be examined while still wet.

Another advantage is that it reduces the handling of the films to a positive minimum. Heretofore it has been necessary to remove the films from the old style developing hanger when dried, sort them out into their proper positions, and then mount them preliminary to examination. With my device but one handling is requisite, namely, the insertion of the films into the proper holders, where they remain during all the steps between development and examination.

It will be evident from the foregoing that I have devised an original and useful film holder or hanger which will not mutilate the film, which will hold it firmly when it is put into solution, and prevent it from curling, and by which the film may be developed, fixed, washed and dried in a flat position, thereby insuring that it will remain flat when removed from the hanger.

It will be understood that the number of windows or openings and the position of them in my holders may be varied at will, and that various changes and modifications may be made in the practical embodiment of my device set forth herein, without departing from the spirit of my invention as defined in the annexed claims.

What I claim as new and desire to secure by Letters Patent, is:

1. In a metal film developing holder, the combination of a frame having a plurality of openings therein, metallic means attached to the frame adjacent each of said openings for firmly holding films therein in a flat position while they are being developed, fixed, washed and dried.

2. In a metal film developing holder, the combination of a frame having a plurality of openings, a member attached to said frame adjacent each of said openings, said member forming a guideway to receive and hold a film in flat position while it is being developed.

3. In a metal film developing holder, the combination of a frame having a plurality of openings, a member attached to said frame adjacent each of said openings, said member forming a guideway to receive and hold a film in flat position while it is being developed, fixed, washed and dried, each of said guideways being open at one end for the insertion and removal of the film, the corners at said open end being upturned for the purpose set forth.

4. In a film developing holder, in combination, a metal frame having a plurality of openings and means for mounting therein one or more individual holders, individual holders having openings, and means for retaining films in said openings in flat position while they are being developed, fixed, washed and dried, all the holders being made of metal.

5. In a film developing holder the combination of a metal frame having a plurality of openings therein, a plurality of individual metal holders each of which has a plurality of openings, portions of the frame surrounding its openings being depressed to hold the individual holders in said openings, each of the individual holders being provided with means adjacent its openings to receive and hold films inserted therein, said individual holders adapted to be so placed in the frame as to position the films in the order in which they were taken and hold them flat during the process of developing, fixing, washing and drying them.

In testimony whereof, I have signed my name to this specification.

ELLIOTT B. MABEE.